June 30, 1936. E. P. BUTUSOV Re. 20,023

ELEVATOR CONTROL SYSTEM

Original Filed Dec. 22, 1930 4 Sheets-Sheet 1

WITNESSES:
Birney Hines
Fred C. Milham

Emil P. Butusov, Deceased
INVENTOR

Fred. C. Eckmann, Administrator
BY
ATTORNEY

June 30, 1936. E. P. BUTUSOV Re. 20,023

ELEVATOR CONTROL SYSTEM

Original Filed Dec. 22, 1930 4 Sheets-Sheet 2

Fig. 2. Emil P. Butusov, Deceased

INVENTOR

Fred C. Eckmann, Administrator

BY

ATTORNEY

WITNESSES:

Fred. C. Milhaus

Birney Hines

June 30, 1936. E. P. BUTUSOV Re. 20,023

ELEVATOR CONTROL SYSTEM

Original Filed Dec. 22, 1930 4 Sheets-Sheet 3

Emil P. Butusov, Deceased
INVENTOR
Fred. C. Eckmann, Administrator
BY
ATTORNEY

WITNESSES:
Fred. C. Wilhelm
Birney Hines

June 30, 1936. E. P. BUTUSOV Re. 20,023

ELEVATOR CONTROL SYSTEM

Original Filed Dec. 22, 1930 4 Sheets-Sheet 4

WITNESSES:
Fred. C. Eckmann
Birney Hines

Emil P. Butusov, Deceased
INVENTOR

Fred. C. Eckmann, Administrator
BY
ATTORNEY

Reissued June 30, 1936 Re. 20,023

UNITED STATES PATENT OFFICE 20,023

ELEVATOR CONTROL SYSTEM

Emil P. Butusov, deceased, late of Hollywood, Ill., by Fred C. Eckmann, administrator, Riverside, Ill., assignor, by direct and mesne assignments, to Westinghouse Electric & Manufacturing Company, a corporation of Pennsylvania Original No. 1,946,777, dated February 13, 1934, Serial No. 503,936, December 22, 1930. Application for reissue July 9, 1935, Serial No. 30,558

32 Claims. (Cl. 177—336)

This invention relates to improvements in elevator control systems, and the like, and more particularly to means for selecting and calling a car.

Where the elevators are grouped in banks and a passenger presses a button, say for a down car, in the former systems, the floor light will be flashed by the first car that approaches the floor, but the passenger does not know which floor light is going to be flashed until the car is almost at the floor, and may be standing at the opposite end of the bank when the car arrives. Therefore an object of this invention is to provide means whereby the act of pressing the button will select a car, or the nearest car and the corresponding floor light will immediately be lit so that the passenger can go at once to the door for that elevator.

Further objects are to select and lock up the signals so that they cannot be affected by any other car, and also to place the signals under the control of any one in the elevator so that they may be disconnected at will.

Further objects are to provide a simplified form of selector for accomplishing the desired results, and other objects and advantages will become apparent when the invention is more fully understood from the following description, with reference to the accompanying drawings, in which an illustrative embodiment of the invention in a non-automatic elevator system is shown:

Fig. 1, Fig. 2, and Fig. 3 combine, in the same order, to form a circuit diagram of the elevator system.

Figure 1:
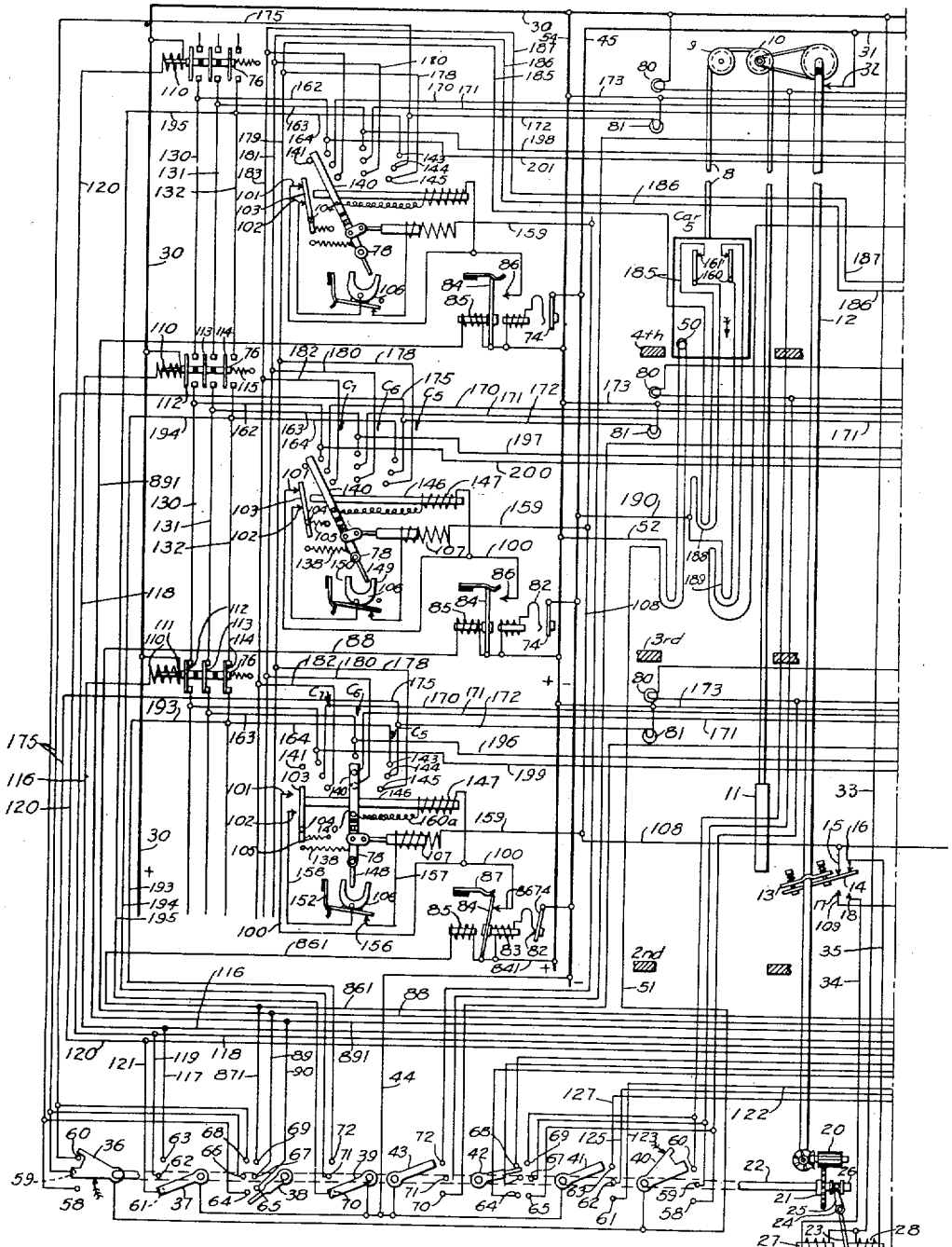

In the drawings are diagrammatically shown three elevator cars 5, 6, and 7, and three floors, as the second, third and fourth, the top floors being omitted in order to simplify the description, and any one skilled in the art will readily understand and be able to supply the connections therefor.

The cars are each suspended in their respective shafts by a cable 8, supported on sheaves 9 and 10, and counterbalanced by the weight 11. The sheaves are driven in any well known manner to raise or lower the cars.

To the sheave 10 is positively connected a signal operating shaft 12 which thereby is rotated in accordance with the operation of the car to which it is related. Frictionally mounted on each shaft 12 is a direction switch 13. The cars 5 and 6 are represented in the drawings as rotating their switches 13 in a counter-clockwise direction when they are going down and in a clockwise direction when going up, but car 7 (by reason of the arrangement of its sheave 9) is represented as driving its switch 13 in a counter-clockwise direction when going up and in a clockwise direction when going down. The switch arm 14 is thereby moved between the down contacts 15 and 16, and the up contacts 17 and 18.

Figure 2:
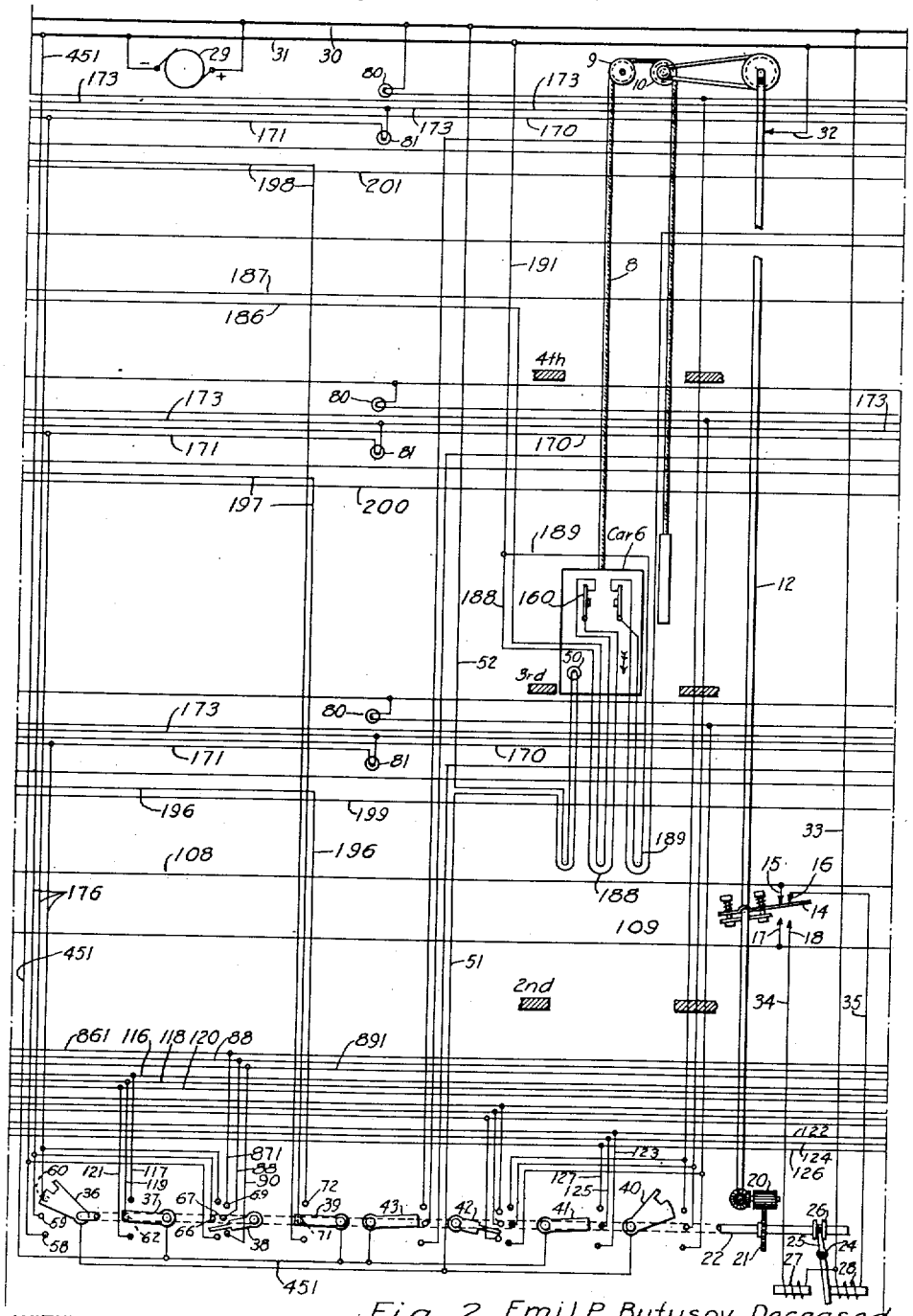

To the shaft 12 is geared a long pinion 20 which meshes with a gear 21 which is fixed on the switch-arm shaft 22. The shaft 22 is rotatably and slidably mounted, and is positioned axially by means of the arm 23, which is pivoted at 24 and has a fork 25 which engages in a grooved collar 26 fixed on the shaft 22. The arm 23 is associated with the solenoids 27 and 28 for positioning the switch-arm shaft 22 in accordance with the direction of travel of the related car, the shaft 22 being moved to the left, as shown in Fig. 1 and Fig. 2, for the down cars, and to the right for the up cars.

The circuits for energizing the direction solenoids 27 and 28 will now be described. Electrical power is supplied from the generator 29 to the positive line 30, and to the negative line 31; and the negative line is connected to each shaft 12 by the contactor 32, the shaft being employed as a conductor to the direction switch arm 14, which connects the contacts 15, 16 in one position and the contacts 17, 18 in the other position. The positive ends of the solenoids 27 and 28 are joined and connected by the wire 33 to the positive line 30, and the negative ends are connected respectively to the contacts 18 and 16 by the wires 34 and 35.

Thus, when the arm 14 is against the contact 16, current flows from the positive line 30, lead 33, solenoid 28, contact 16, switch arm 14, shaft 12, contact 32, to the negative line 31. This causes the solenoid 28 to move the lower end of the arm 23 to the right, Fig. 1, and positions the shaft 22 to the left. As soon as the car starts in the opposite direction, the shaft 22 is at once reversed, the connection for the solenoid 28 being broken at contact 16, and the connection for the opposed solenoid being made at contact 18 to the switch arm 14, shaft 12, contact 32, and line 31.

On each of the shafts 22, one of which is connected to each car, are two groups of oppositely arranged switch arms, the car light switch arm 36, the floor switch controller arm 37, restoring switch arm 38, the floor light switch arm 39, all for the downward movement; and the car light switch arm 40, floor switch controller arm 41, restoring switch arm 42, and the floor light switch arm 43, for the upward movement of the associated car.

The switch arms 37, 39, 43, and 41 of each shaft 22, are joined and connected to the negative line wire 31 by the connector 44 and wire 45, in the group associated with car 5; and by the connector 451, in the group of switches for car 6; and connector 47 and lead 48 for the group for car 7.

The arms 36 and 40 are connected together and to the car light 50 of the associated car by the hanging line 51 in each case, the car light being connected through another hanging wire 52 to the down leads 54 connected to the plus line 30 in the circuits for cars 5 and 7, and directly to the line in the circuit for car 7.

With said switch arms are associated circles of contact points for each floor which are wiped by the arms in correlation with the movement of the car, the circles for one group 36–39 being in spaced relation with the circles for the other group 40–43, so that when the arms of one group are in position to make contact with the points, the other group is out of contacting relation. The contacts for each car are designated 58, 59, and 60 for lever 36, and also for lever 40; 61, 62, and 63 for the floor switches 37 and 41; pairs of contacts 64 and 65, 66 and 67, 68, and 69 for the restoring switches 38 and 42; and the single contacts 70, 71, and 72 for the down and up floor light switches 39, 43.

The switch arms are shaped as described in the Patent No. 1,699,685, so that, for example, when the corresponding car is moving down, contact is made in the respective switches according to the position of the car.

At each floor is provided a push-button switch 74 for signaling the cars going down, and 75 for up cars; and related with each floor is provided a car-operated floor switch 76 for down cars, and 77 for up cars, and a car selector switch or commutator 78 for up and 79 for down; and also an up floor light 80 and a down floor light 81, for each car.

The push buttons 74 are normally open and are connected at one side to the negative line wire 45, and the buttons 75 to the negative line wire 48; and when a button is pressed contact is made to a finger 82 and to one terminal of the push-button switch-operating solenoid 83 which is connected by the lead 841 to the positive wire 54. This attracts the push-button switch arm 84 from normal position against the restoring magnet 85 into contact with the switch point 86, the spring detent finger 87 being constructed to yieldably hold the arm in either position after the current is broken in either solenoid 83 or 85, whichever has last been energized to move the arm.

The lead 841 at each push button is also connected to the switch arm 84 and one terminal of the solenoid 85, the other terminals of the solenoids 85 being connected for the second floor by the wire 861 and connectors 871 to the contacts 69 of each of the down restoring switches 38. The solenoid 85 at the third floor is similarly connected by line 88 and connectors 89 to contacts 67; and at the fourth floor the corresponding solenoid 85 is connected by the line 891 and jumper 90 to the contacts 65 of switches 38. The solenoids 85 of the up switches 75 are similarly connected by lines 91, 92 and 93 to the similar contacts 64, 66, 68 of the up switches 42.

The points 86 of each push button are connected by lead 100 to a contact 101 of the corresponding selector switch; and the contact 101 is normally connected with the contact 102 by the switch arm 103 which is pivoted at 104 and urged counterclockwise by the spring 105. The contact 102 of each selector switch is connected through the repeat switch 106, solenoid 107, the opposite terminals of the solenoids 107 being joined by a jumper 159 to the wire 108, for the down switches, which connects to the contacts 15 of the reversing switch, and for the up switches 79 by the wire 109 to the contacts 17. Thus, when a button is pushed, the solenoid 107 corresponding to the floor and direction desired is energized and the selector switch set into operation, as will be described below.

The cars also have a control over the calling and signal circuits through the floor switches 76 for down cars and 77 for up cars. The switches 76 and 77 each have a solenoid 110, which attracts a plunger 111 to which are connected the relatively insulated cross switch elements 112, 113, and 114, and the plungers are normally drawn to the right, or left, and the switches closed by the springs 115. One terminal of each solenoid 110 is connected to the plus line 30. The opposite terminals of the down floor switch for the second floor are connected by line 116 and jumpers 117 to the second-floor contacts 63 of the switches 37; the solenoid 110 of the down floor switch for the third floor by line 118 and jumpers 119 to switch 37, contacts 62; and the solenoid 110 of the down floor switch of the fourth floor by line 120, jumpers 121 to contacts 61 of the floor switches 37.

The up floor switches have their solenoids 110 similarly connected to the line 30, and the opposite terminals are connected for the second floor by line 122 and jumpers 123 to the second floor contacts 61 of the switches 41; for the third floor by line 124 and jumpers 125 to contacts 62; and for the fourth floor by line 126, jumpers 127, to contacts 63 of said switches 41.

Figure 3:
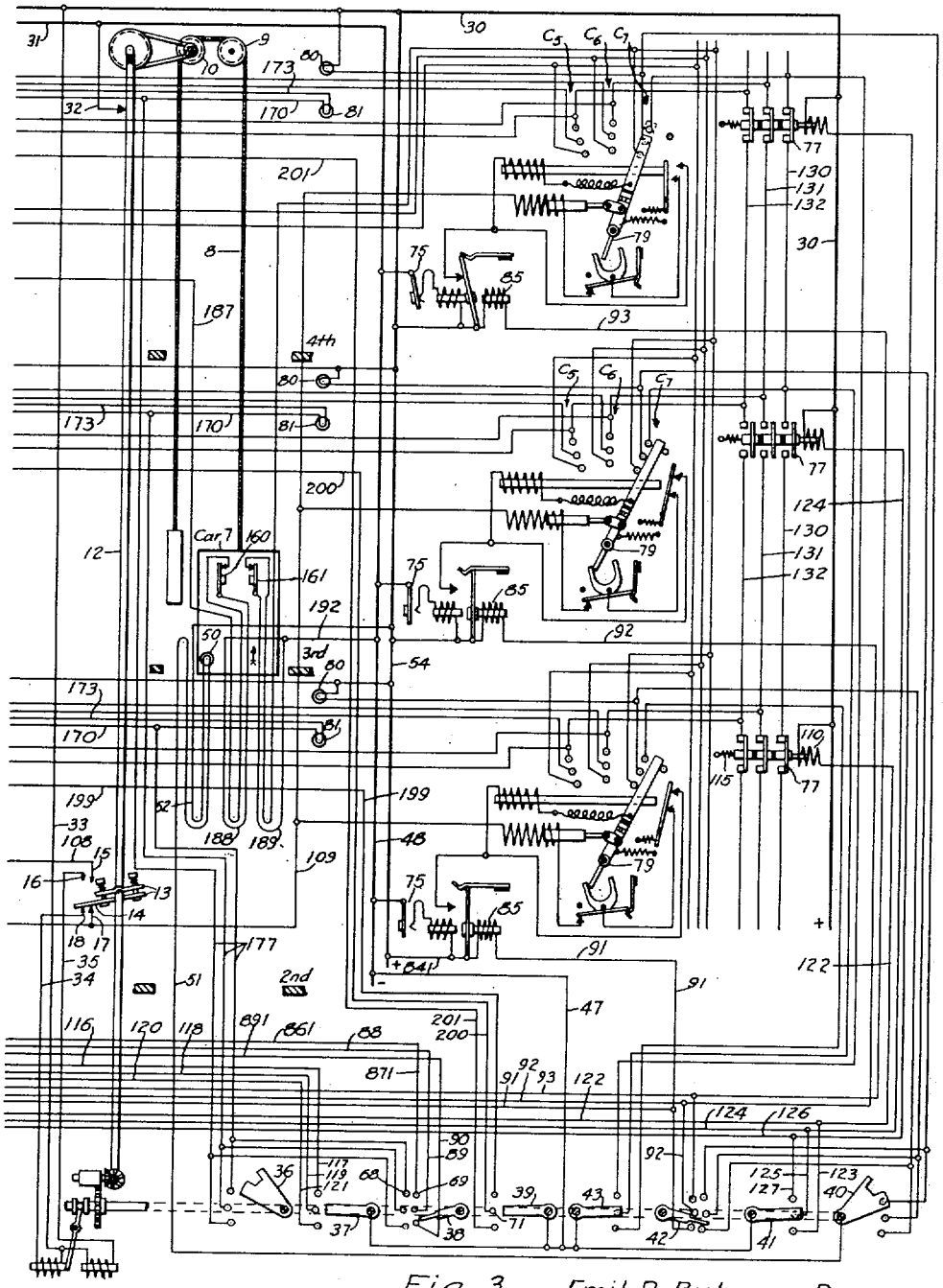

Thus when a car is nearing a floor, the switch arm 37 or 41, depending upon the direction of the car movement, contacts with the points 61, 62 or 63, and closes a circuit, as for car 6 going down, from positive line 30, through second-floor switch solenoid 110, line 116, jumper 117, through switch arm 37 associated with car 6, line 451 to the negative line 31. This, as shown in the drawings, has opened the second down floor switch elements 112 by attracting the plunger 111 against the action of the spring 115. With the cars positioned as shown in the drawings, with car 5 going down at the fourth floor, car 6 down at the third floor, and car 7 going up at the third floor, the down floor switch at the fourth floor has been opened by car 5, the down floor switch for the third floor has been opened by car 6, and the down floor switch for the second floor is closed because no down traveling car is in the second-floor zone. Then, as shown in Fig. 3, the up floor switches are closed at the second and fourth floors and are in normal position, and the third up floor switch has been opened by the switch 41 of the car 7.

The switch elements 112, 113, and 114 of the two lines of floor switches 76 and 77 are respectively interconnected by the lines 130, 131, and 132, so that when all the switches in either line are closed a continuous interconnection through said lines is made from one floor to the next, and when any switch is opened by a car the interconnection is broken to the floors above, by down traveling cars, and to the floors below by up traveling cars.

Figure 4:
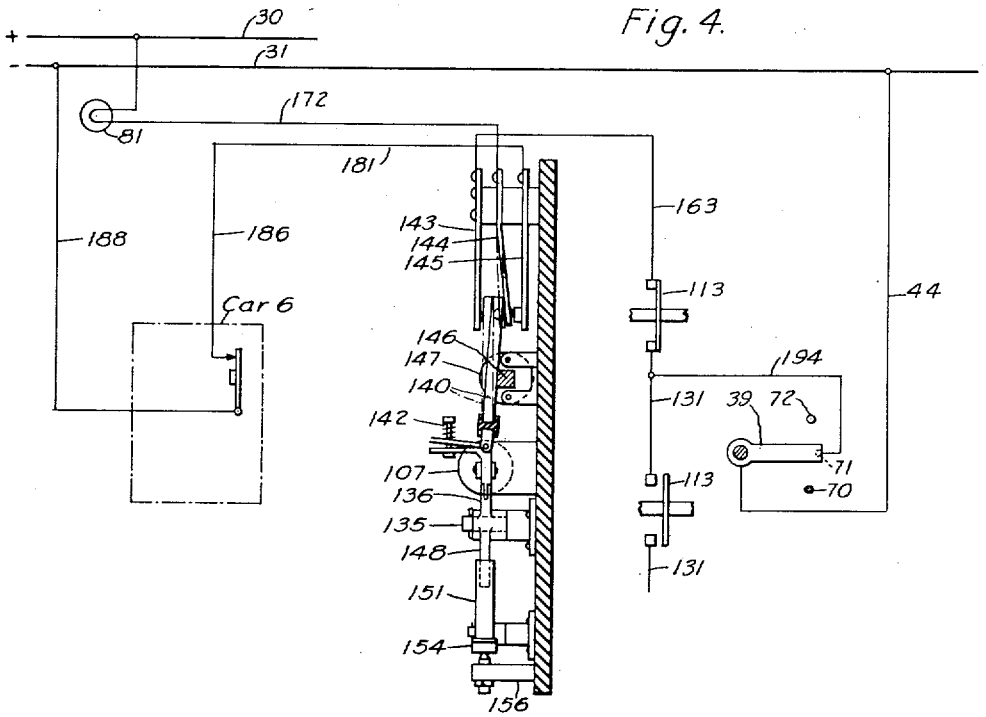
Fig. 4 is a view in side elevation of the selector switch with a simplified circuit diagram.
Figure 5:
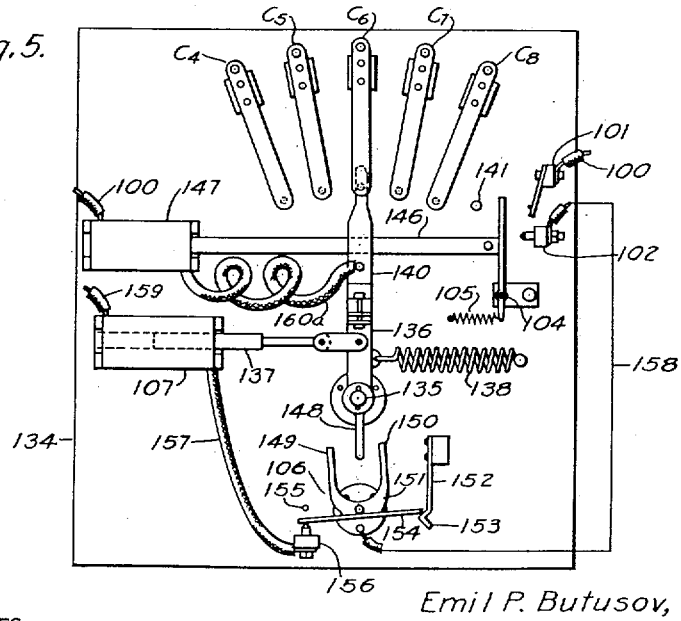
Fig. 5 is a front elevation of the same.

The selector switches 78 and 79 are similar in their mechanical construction, which will now be described more particularly with reference to Fig. 4 and Fig. 5, like reference characters for like parts being applied to the circuit diagram figures. On an insulated base 134 is fixedly mounted a post 135 on which the switch arm 136 is pivotally mounted. Said arm is pivotally connected to the plunger 137 of the solenoid 107 to move the arm against the action of the spring 138, anchored to the base 134, away from its normal position, in which the end 140, pivotally connected to the main portion of the arm, is against the stop pin 141, fixed in the base. The end 140 is normally biased to the position shown in broken lines in Fig. 4 by the spring 142.

Mounted on the base in a circle in co-operative relation with the end 140 of the switch arm 136 is a plurality of stands C, comprising three spring contact fingers 143, 144, and 145; stands C5, C6, and C7 being, respectively, for the cars 5, 6, and 7.

The switch arm 103 is pivotally mounted on the base and similarly connected to an iron solenoid plunger bar 146 which extends underneath the arm 140, normally spaced therefrom, and the bar is normally moved to close the switch 103 by the spring 105. The opposite end of the bar 146 extends into a solenoid 147, mounted on the base. The pivoted arm portion 140 sweeps between and in contact to connect both the fingers 143 and 144 as the switch arm is swung over by the solenoid 107. But when the bar 146 is magnetized by the flux in the solenoid 147 the arm 140 is pulled down away from finger 143 to depress the middle finger 144 into contact with the finger 145, as shown in full lines in Fig. 4. This full-line position is indicated in the diagrams in the fourth-floor selector switch 79 in Fig. 3, and in the second-floor down selector switch 78 in Fig. 1, by shortening the arm so that it connects the contacts 144 and 145 of the stack with which the arm is instantaneously in contact, it being understood that otherwise the arm only connects the contacts 143 and 144.

The arm 136 has a finger 148, projecting below the pivot 135, which extends between the arms 149 and 150 of the bifurcated repeat switch lever 151 which is pivotally mounted on the base 134. Normally the finger 148 is against the arm 149, in which position the lever 151 is held by a spring detent finger 152, mounted on the base. The finger 152 has an angular projection 153, on one side or the other of which is engaged the end of the cross bar 154, in either of the two positions of the switch, the bar 154 being rigidly secured to the lever 151. The opposite end of the bar 154 oscillates between a stop 155 fixed on the base, and a binding post contact 156, also fixedly mounted on the base.

The binding post 156 is connected by the wire 157 to one terminal of the arm-operating solenoid 107, and the switch arm 151 is connected by the wire 158 to the contact 102. The terminal of the solenoid 147, opposite to the terminal connected to the line 100 is electrically connected by the flexible wire 160*a* to the arm end 140, so that current can flow from the solenoid to the fingers 143, 144 or 144, 145, with which the arm may be in contact.

In operation, the repeat switch 106 acts to break the connection to the solenoid 107 at the binding post 156. The finger 148, when the lever 136 is pulled across the last group of fingers C4, strikes against the arm 150 and rotates the lever 151, so that one end of the bar 154 moves across the point of the projection 153 and engages with the outer side thereof, the opposite end of the bar being swung away from the post 156 and against the stop pin 155. Then as the spring 138 pulls the lever 136 back to starting or normal position with the end of the arm against the stop 141, the finger 148 strikes the arm 149 and rotates the lever 151 back to normal position to restore the contact with the binding post 156 from the wire 158.

The functioning of the selector switches will now be more fully described with reference to the circuit diagrams of Fig. 1, Fig. 2, and Fig. 3. In each car is provided a hand-operated switch 160 for controlling down signals, and 161 for up signals or signals from the floors above, and these switches are normally closed.

Referring to the down selector switches 78, Fig. 1, in each switch the upper contact fingers 143 of the C7 groups are connected by a wire 162 to the wire 130 below the corresponding floor switch element 112; the upper fingers 143 of the next groups, C6, by a wire 163 to the wire 131 on the lower side of the corresponding floor switch element 113; and the contacts 143 of the next group C5 are similarly connected by a wire 164 to the connectors 132.

The middle contact fingers 144 of the groups C7, C6 and C5, in each switch 78, are connected, respectively, by the wires 170, 171, and 172 to the one terminal of the down lights 81 at the floors corresponding with each of said switches. The opposite terminals of all the floor lights 81 are connected to a wire 173 which is connected to the riser line 54, and hence to the plus line 30.

The middle contacts are also connected for energizing the car lights, as follows: In the C5 groups the lead wires 172 of said contacts are each connected by a wire 175 to one of the contacts 58, 59 or 60 of the car light switches 36 corresponding to car 5, the contact 144 at the second floor being connected to switch contact 60; the contact 144 at the third floor to contact 59; and the contact at the fourth floor to 58, so that the car 5 will energize the down lights at the floors in succession at which down calls are registered as the car moves down.

The middle contacts 144 of the C6 groups are similarly connected in succession by the wires 176, leading from wires 171, to the contacts of switch 36 for car 6, Fig. 2; and the middle contacts of the C7 group are similarly connected by wires 177, leading from wires 170, Fig. 3, to the contact points of switch 36 for car 7, this arm of this switch being moved out of engaging relation because the car is going up.

The middle contacts control the car lights and the floor lights through the car-operated switches 36, which connect the middle selector switch contacts through the respective car lights to the positive line 30.

The bottom contacts 145 are for locking the switch arm 140 in selective position, and are connected as follows:

The bottom contacts 145 in the C5 groups are each connected by a jumper 178 to the riser line 179; contacts 145 in the C6 groups by a jumper 180 to line 181; and contacts in the C7 group by jumpers 182 to line 183. To the line 179 is connected a wire 185, which is looped in the shaft and connected to the contact of the car switch 160 of car 5. Line 181 is connected by wire 186 to the contact of the switch 160 in car 6; and line 183 is connected by wire 187 to the contact of switch 160 in car 7.

The levers of switches 160 and 161 in each car are connected, respectively, to the looped wires 188 and 189, which are joined by the jumper 190 to the downwardly extending portion of the negative line 31 for car 5; by the riser line 191 to line 31 for car 6; and by the jumper 192 through riser 48 for car 7.

The contacts 143 are also connected to the contacts of the down floor light switches 39, so that the connection to the negative line is controlled by the movement of the car. These connections are as follows: The connectors 132, which, as described above, are connected at each floor by leads 164 to the contacts 143 of the switches C5 of the same floor, are connected below the second-floor switch element 114 by line 193 to the contact 72 of switch 39, from below the third-floor switch by line 194 to contact 71; and from below the fourth-floor switch by line 195 to contact 70.

The line 131, and hence the top contacts 143 of the switches C6 are connected from below the second, third and fourth floor switch element 113, respectively, by lines 196 which connect from lead 163, and hence from the floor connector 131 below the second-floor switch 113, to the car 6 floor-light switch 39, Fig. 2; by line 197 from below switch element 113 at the third floor to contact 71; and by line 198 to contact 70 of the same switch.

Then the contacts 143 of the switches C7 are similarly connected from below each corresponding floor switch element 111 to contacts 72, 71, and 70 of the floor-lights switch by leads 199, 200, and 201.

This completes the circuits for the down cars, which will now be briefly reviewed. It can now be seen that the middle contacts 144 at each floor are connected through the respective floor light 81 to the positive line, traced as follows: contact 144, lead 172, light 81, bus line 173, forming a common return for all of the same floor lights, and connected to positive wire 54 for the car 5 switches; for the car 6, contact 144 in the C6 switches, lead 171 to light 81 for car 6; and from contact 144, lead 170, to the down light 81 for car 7; and these contacts in each group are also connected to the car light switch 36 with which the particular contact is related, traced as follows: from contacts 144 in the groups C5 by wires 175 to the respective contacts 58, 59 or 60 in the switch 36 for car 5; in group C6 by wires 196, 197 or 198 to the corresponding contacts in switch 36 for car 6; and in group C7 by the wires 199, 200 and 201 to the corresponding contacts in switch 36 for car 7. Since each contact arm of the car-light switches is connected to the corresponding car light, line 51, light 50, line 52, positive wire 54 at each car when the negative line is connected to any one contact 144, the light for the corresponding floor and also car will be flashed, and also the car light through the control of the car-light switch. That is, the floor light and the car light will thereby be selected. The contacts 145 are each permanently connected through to the corresponding car switch 160 and negative line, a contact for each car being provided in the selector switch at each floor. Contacts 143 are also connected through the switch elements 112, 113 or 114 at the corresponding floor to the floor above, and on to the succeeding floors until an open switch is met and the connection stopped. Between each floor the contacts 143 for the switches C5 are connected to the corresponding points of the floor switch 39 for car 5, lines 193, 194, 195; and likewise from between each floor or below the corresponding floor switch elements 113, the top contacts for the switches C6 are connected to the corresponding points of the switch 39 for car 6; and likewise the top contacts for the switches C7 to the floor switch for car 7; and the arms of all the floor switches are permanently connected to the negative line. Accordingly, to make a connection from the negative line through the top contacts 143 to middle contacts 144 to light the car and floor lights which are always connected at one side to the plus line, the proper connection must be made through the car-light switch and floor switch, for the car light, and through the floor-light switch and the floor switch for the floor light.

The bottom contacts 145 are permanently connected through the corresponding car switches to the negative line so that connections to the middle contacts for lighting the lights may be made from the bottom contacts, as well as the top contacts.

The remaining circuit connections for the upward motion of the cars are substantially in duplicate of the connections just described for the down cars and the functioning is the same except in the difference in direction of the car travel; and the two systems are substantially independent of each other, the controls being changed from one system to the other by the reversing switches.

Now will be described the operation when a push button is pressed at any floor for a car in either direction, as, for example, the second-floor down button, as shown in the drawings, in order to select and hold the nearest car in any of the elevator shafts, and to light the floor light at the shaft for that particular car and none other.

As the cars are traveling up or down the normally closed floor switches are being opened accordingly. When a car is approaching a floor, as, for example, the car 5 moving down to the fourth floor, the solenoid 28 has been energized to place the arm 14 of the reversing switch in contact with the points 15 and 16, the circuit for the solenoid being closed through contact point 16 to the shaft 12. The switches 40–43 are out of contacting position and the down switches are in position to make contact. The switch 39 closes to contact 70, the switch 37 closes to contact 61, and the switch 36 to contact 59; the restoring switch being ready to connect contacts 64 and 65 as the car leaves the floor and the other switches open.

The floor-light switch makes a negative line connection to line 132 below the fourth-floor switch element 114, or between the fourth and third floor switch elements 114, so that the connection is stopped if these floor switches are open, as shown. This connection traces as follows: negative line 31, leads 45 and 44, arm 39, contact 70, lead 195, fourth-floor wire 132. From said wire 132, the lead 164 connects to the top contact 143 of the C5 switches on that floor related with car 5. This energizes said contact; and as the car moves down, the similar contacts in group C5 are energized at each floor. But if the adjacent floor switches are closed the middle contacts in the next floor switches in the group C5 will be energized until an open floor switch breaks the connection.

In this position of the car 5 the floor switch controller 37 makes connection from the negative line, to contact point 61, lead 121, line 120, solenoid 110 at the fourth-floor switch, and to the positive line 30. This has only the effect of opening the floor switches 112, 113, 114 at that floor, and the switches remain open until the car moves down and the contact at 61 is broken, allowing the spring 115 to close the switch. Also, any of the cars in the same position will similarly affect the floor switch. Then the car-light switch 36 makes a connection from plus line 30, lead 54, connection 52, through light 50, line 51, switch arm 36, contact 59, corresponding line 175, through junction point on line 172, to contact 144 of the group C5 at the third floor. This also makes a connection from line 172, down light 81, and back to the plus line, which is of no effect, the main effect being that the car light is connected up to said contact ready to be energized when the related contact 143 is energized from the negative line, as described above.

Thus in the down circuits, with the cars 5 and 6 going down as shown, the down floor switch at the fourth floor is opened by car 5, and the down floor switch at the third floor is opened by car 6. This circuit is traced as follows: negative line 31, lead 451, Fig. 2, floor switch 37, contact 62, lead 119, line 118, solenoid 110 at the third floor, to plus line 30. This cuts off the top contacts 143 in the third-floor selector switch from any connections to the lower floors through the connectors 130, 131 or 132; but the connection from the third floor, from below the third-floor switch, to the second-floor switch, is closed because there is no car traveling downward below the third floor.

The operation of the selector will now be described in connection with the series of occurrences which are instituted when a push button is operated, particularly the push button for the down cars at the second floor. When the button is pressed a connection is made from the negative line 31, line 45, through the switch, to the contact 82, through the button-switch solenoid 83, through the connector 841 to the positive line 54, thus completing a circuit through the solenoid 83 for energizing the same and moving the lever 84 from its normal position toward the solenoid 83, clockwise, into contact with the point 86. In this movement the end of the lever 84 is pulled past the angular end of the detent 87 into engagement with the opposite side thereof so that the lever is held in operative position. This makes a connection from the positive line 54 through the lever 84, contact 86, lead 100, through the lock-up solenoid 147 and connector 160a, to the movable end 140 of the selector switch arm 136, where the connection ceases because, in normal position, the selector arm is only in contact with the stop 141. From lead 100 a connection is made to the contact point 101, through the switch arm 103 to contact 102, the arm being normally against both of said contacts, and the connection from 102 is made through the lead 158, repeat switch arm 106, contact 156, connector 157, solenoid 107, connector 159, to the lead 108. All of the selector operating solenoids 107, for the same direction, are likewise connected to the line 108, but the connections from the opposite sides of the solenoids are normally open at the contact 86. From the line 108 the connection is completed through the contact 15, associated with any downwardly-moving car through the corresponding switch arm 14 and shaft 12 to contact 32, and thence to the negative line 31. Thus, by pressing the push button, contact is made at 86 for energizing the solenoid 107 for the corresponding floor switch.

When the solenoid 107 is energized, the selector switch arm is drawn across the series of contacts between the contact fingers 143 and 144 thereof. When the end 140 of the lever moves between the upper and middle contact fingers of the switch group C7, no circuits are completed. These connections are traced as follows: from said contact 143 the line 162 leads to floor connector 130, upwardly through the switch 112 to the corresponding switch which is open at the third floor, then by the lead 162 which is connected to the line 130 communication is had to the contact 143 of the third-floor switch, and also through the connector 200 to contact 71 of the switch 39 which is related with the car 7. This switch is open because the car is moving upwardly. The connections from the contact finger 144 of group C7 lead only to the positive line, traced as follows: the contact, line 170, over to Fig. 3, through the floor light 81 of car 7, back through line 173 or common feed wire for all of the floor lights 81, to the positive line 54, Fig. 1. The other connection from line 170, in Fig. 3, is by the corresponding connector 177 to the point in the switch 36 which is also out of contacting relation. If the contacts are all in normal condition with the top fingers deenergized, the switch arm will sweep completely across the series, and the lower projecting finger 148 will strike the arm 150, of the switch lever 151, and reverse the position of said switch so that the contact for the switch-operating solenoid 107 is broken at the binding post 156. The spring 138 will then return the lever to the starting position, against the stop 141, and the finger 148 will strike the opposite arm 149 and reverse the switch 151 and restore the contact at the binding post 156. Since the contact at 86 is held by means of the detent finger 87, the solenoid 107 will be reenergized and the operation repeated until a car has energized one of the upper contact fingers. Thus, if all of the cars are going up at any one time, the selector operated for down cars will repeat until the first car starts down.

In the position shown in the drawings, two cars are going down and the selection will be made to the nearest car. This is accomplished as follows: as explained, the floor switches are normally closed. Therefore the switch at each floor up to the nearest car will be closed, and communication thus established from one floor to the next. In the drawings, the nearest car is car 6 at the third floor, and the switch arm 39, of car 6, is making contact from the negative line through the lead 451 to contact 71, connecting line 197, to the top contact in the group C6 of the third floor, and through the connector 163 to the floor connector line 131; below the open floor switch 113, the line 131 leads down through the closed switch 113, at the second floor through the corresponding lead 163 to the top contact of the group C6, and thus energizes that contact.

When the switch arm 140 strikes the energized contact, connection is then made to the corresponding contact 144, lead 171, floor light 81 at the second floor for the car 6, the opposite side of the floor light 81 being connected to the positive line as described. This also completes the circuit for the car signal light 50, traced as follows, starting in Fig. 2; positive line 30, connector 52, through the loop, through the car light 50, through the down lead 51, the switch arm 36, contact 60, line 171, contact 144, contact 143, and to the negative line, as described.

The negative connection to the arm 140 completes the circuit for the solenoid 147, through the flexible connector 160, solenoid 147, through the closed contact 86 to the positive line. This attracts and magnetizes the solenoid plunger 146. The plunger pulls the switch arm 103 out of engagement with the contacts 101 and 102, thus breaking the circuit for the switch-operating solenoid 107. At the same time, the arm 140 is attracted downwardly and pulled away from the top contact 143. This depresses the middle finger 144 into contact with the lower finger 145, which is connected to the negative line through the car switch, as follows: the contact finger 145, corresponding lead 180, the continuous floor connector 181, connector 186, which is looped and connected to the contact of the car switch 160, for car 6, then continuing through the switch, connector 188, and lead 191, to the negative line 31. Thus the signal light and floor light are held under control through the connection 86. When the car passes the second floor, the corresponding switch arm 38 makes the connection between the contacts 68 and 69. This will energize the restoring solenoid 85, the circuit being as follows: positive line 54, lead 841, solenoid 85, line 861, lead 871, corresponding to the second-floor, to the contact 69, in the switch corresponding to the car, arm 38, contact 68, corresponding lead 176, line 171 to the contact 144 of group C6 of the second floor. Then to the bottom contact 145, lead 180, line 181, lead 186, through the car switch 160, lead 188, connector 191, to the negative line 31.

It can now be seen that the floor light and car light, after being selected, are disassociated from the selector; the selector is locked in position by disconnecting the operating solenoid 107 and holding the arm against the bar 146 by magnetic attraction; the selected lights or signals are made independent of the operation of any other car. Thus, the floor light for the selected car is lighted and the passenger can go at once to the shaft for that elevator. Other cars may pass the selected car or even stop at the same floor. However the lights are under the control of the car switch so that the car operator can throw off the lights and break the connections. In this case the selector switch would restart, because the contact 86 stands closed until opened by the passage of a car, and a new selection would be made.

It is obvious that the control circuit of any automatic elevator system could be inserted in the car light circuit and the elevator called and brought to the floor, and such use of this invention is contemplated, as well as the use in a non-automatic system, which was used in the explanation mainly because such a system is somewhat more simple and more easily understood. Hence it is to be understood that the "car light circuit" represented by conductors 51 and 52 is a means functionally related to the stopping of its car at a floor and which may be utilized either for lighting a preregistered signal in the car or for effecting operation of a stopping relay or other means for stopping the car at a floor.

While but one illustrative embodiment of this invention has been shown and described many alterations and omissions may be made without departing from the spirit of the invention, as defined in the following claims.

What is claimed as the invention:

1. In an elevator system for a plurality of cars and floors a car selector for each floor, an open signal circuit for each car, a contact for each of said circuits in each selector, a normally closed floor switch for each floor for inter-connecting said contacts from one floor to the next with the contacts for each car in a separate series, a signal switch operated by each car for energizing the related selector contacts at the floor adjacent the car, and a floor switch controller operated by each car to open said floor switches corresponding to the floors which the cars have passed, and manually operable means for each floor for operating the corresponding selector to successively wipe said contacts so that when connection is made with an energized contact the signal circuit related therewith will be completed to perform its function.

2. In an elevator system for a plurality of cars and floors a car selector for each floor, an open signal circuit for each car, a contact for each of said circuits in each selector, a normally closed floor switch for each floor for inter-connecting said contacts from one floor to the next with the contacts for each car in a separate series, a signal switch operated by each car for energizing the related selector contacts at the floor adjacent the car, and a floor switch controller operated by each car to open said floor switches as the cars pass the corresponding floors, manually operable means for each floor for operating the corresponding selector to successively wipe said contacts so that when connection is made with an energized contact the signal circuit related therewith will be completed, the selector having a holding circuit contact related with each of said contacts, and means operated by the completion of a signal circuit to lock the selector in position and substitute the holding circuit for the selector to maintain the completed signal circuit.

3. In an elevator control for a plurality of floors and cars, a selector for the cars having a series of contacts one of which is related with each car, a signal circuit for each car, means operated by each car for energizing the selector contacts related therewith and thereby partially completing the corresponding signal circuit, and signal circuit completing means for successively wiping said contacts so that the partially completed circuit will be completed when the contact to which it is related is wiped by said circuit completing means.

4. In an elevator system having a plurality of cars operating independently, a signal circuit for each car, a selector switch having a series of circuit contacts for consecutively energizing said circuits, and said switch having a series of selector contacts for affecting said contacts for energizing said circuits and having a series of holding contacts for replacing said selector contacts, means operated by the car for controlling the selector contacts, and means operated by the energization of the circuit contacts for affecting the replacement of the selector contacts by the holding contacts so that when one car is selected said signal circuit thereof is energized and disassociated from the selector contacts.

5. In an elevator control system, a normally disconnected signal circuit for each car, a selector having a series of groups of three superposed contact fingers normally disengaged and insulated from each other, an arm for consecutively moving normally between two of the fingers in each group, a solenoid for so moving the arm, a normally open signal circuit connected to each middle contact finger, means operated by a car for connecting one side of one of said circuits to one side of a power line, the first finger in each group being connected to the opposite side of the line under the control of the car so that said signal circuit will be energized when said arm moves between a finger connected to the one side of the line and a finger connected to the opposite side of the line, the third finger of each group being permanently connected to said opposite side of the line, and means operated by the completion of each signal circuit for moving the arm away from the first finger and pressing the middle finger into contact with the third finger.

6. In an elevator control system for a plurality of cars and floors, a normally disconnected signal circuit for each car, a selector switch having a series of circuit contacts connected respectively with said circuits, a corresponding series of selector contacts and a corresponding series of holding contacts related with said series, said circuits being permanently connected to one side of an electrical source, a switch arm cooperating with said contacts and having a relatively movable portion mounted thereon which is yieldably positioned to be engageable with the circuit contact and the selector contact of each one of the series to connect the same, said portion being movable to disengage from the selector and to engage the holding contact, means controlled by each car for energizing the selector contact related therewith by connecting the same to the opposite side of said source, a manually energized switch solenoid for moving the arm consecutively into relation with the related contacts of said three series, and a holding solenoid permanently connected from said arm portion to said one side of the source for disconnecting said solenoid and attracting said arm portion when energized from an energized selector contact and moving the portion into engagement with the holding contact.

7. In a selector switch, a plurality of groups of contacts, a switch arm movable into cooperative relation with said groups of contacts, the arm having a movable portion mounted thereon which is yieldably held in a position to engage with a particular one of said contacts in each group, an operating solenoid for moving the arm, a switch for controlling the operating solenoid, a locking solenoid connected to open said switch and positioned to attract and move said portion out of the position for engagement with said contact and into a position for engagement with another of each group, the locking solenoid being energized by said engagement with either of said contacts.

8. In an elevator system for a plurality of cars, a selector switch, a base, a plurality of groups of three contacts insulated from each other and insulatingly mounted on the base in a series, a switch arm pivoted on the base for cooperating with said groups, said arm having a movable portion yieldably held in position to engage with the first and second of each group of contacts, an operating solenoid for moving the arm into consecutive relation with said group, normally closed switch contacts for energization of said solenoid, a holding solenoid having a plunger for attracting and moving said portion out of said position and into a position for contacting with the second and third fingers, when the plunger is magnetized by the energization of the solenoid, the plunger being then moved to open said switch contacts for deenergizing the operating solenoid, and a means operated by each car connected to energize the first one of each group of contacts, the holding solenoid being connected to said arm portion and thereby energized when said portion moves into relation with one of the first contacts which have been energized, the holding solenoid being then maintained in energized condition by the connection of the movable portion to the third contact of the same group.

9. In an elevator control for a plurality of cars a manually controlled selector commutator having a series of contacts including a contact for each car, a switch arm included in the selector for consecutively engaging said contacts, means operated by each car for energizing the contact corresponding therewith, and electro-magnetic means energized by the engagement of the arm with a contact which has been energized by a car for disengaging the arm from said contact and stopping the motion of the arm.

10. In an elevator system comprising a plurality of cars operating past a plurality of floors, each car having a light at each floor, a commutator operated by each car, a manually operated commutator at each floor in cooperable relation with said car operated commutators to energize said lights under predetermined conditions, and means included in the manually operated commutators for stopping the operation thereof as soon as a light has been energized and disassociating the energized light from the car operated commutators so that said light will not be interfered with by the operation of other cars.

11. In an elevator system comprising a plurality of elevator cars operating past a plurality of floors, a manually operable car signaling commutator at each floor, a signal commutator operated by each car in cooperative relation with said commutators so that a car is signaled when a manually operated commutator is in a predetermined relation with a car operated commutator, the operation of the signalling commutator being repeated until a signal has been given, and means for discontinuing the operation of the signalling commutator and disassociating the same from the car operated commuators as soon as the signal has been given.

12. In a signalling system for a plurality of cars operating in a hatchway past a plurality of floors, a signal device at each of said floors for each of said cars, a control device at each of said floors common to all the cars, means responsive to the position and direction of operation of the cars for dividing the hatchway into as many signal zones as there are cars operating in normal spaced apart relation, each of said zones extending from the position of the car with which it is associated to the position of the next car ahead, the position of each of said cars being defined as the next floor at which it can stop, means individual to each car for controlling its associated zone for signal purposes to the exclusion of the cars associated with the other zones, and means responsive to operation of a control device at a floor, the signal zone associated with that floor and the zone controlling means of the nearest approaching car for energizing only the signal device of said nearest approaching car at the floor of the operated control device.

13. In an elevator system for operating a plurality of cars past a plurality of floors, a plurality of signal devices one for each car at each floor, a control device at each floor common to all the cars, means responsive to operation of the control device at a floor for immediately energizing only the signal device at that floor for the nearest approaching car when the cars are normally spaced apart, and in the event that two cars are approximately equally distant from that floor for immediately energizing only the signal device of one of the two cars at that floor and for determining which car will have its signal energized.

14. In an elevator system for operating a plurality of cars past a plurality of floors, a signal device for each car at each floor, a control device at each floor common to all the cars and means responsive to operation of a control device at a floor for immediately energizing only one of the signal devices at that floor to indicate which car should answer the operation of the control device.

15. In an elevator system for operating a plurality of cars in a hatchway past a plurality of floors, a plurality of signal devices, one for each direction for each car at each floor, an up control device at each floor common to all the cars, a down control device at each floor common to all the cars, and means responsive to the operation of a control device and to the position of the cars for immediately energizing only one signal device, said signal device being at that floor of the operated control device and for the direction of the operated control device.

16. In an elevator system for operating a plurality of cars in a hatchway past a plurality of floors, a plurality of signal devices, one for each direction for each car at each floor, an up control device at each floor common to all the cars, a down control device at each floor common to all the cars and means responsive to the operation of a control device and to the position of the cars for immediately energizing only the signal device of only one of the cars at the floor of the operated control device and for preventing the energization of the signal device of any other car at the same floor for the same direction in response to said operated control device.

17. In an elevator system for operating a plurality of cars in a hatchway past a plurality of floors, means responsive to the position and direction of operation of the cars for dividing the hatchway into a plurality of signal zones, a plurality of signal devices, one for each direction for each car at each floor, an up control device at each floor common to all the cars, a down control device at each floor common to all the cars, means responsive to operation of a control device for immediately energizing the signal device of the car in the nearest zone in the corresponding direction when only one car is in that zone, and for energizing only the signal device of only one car when a plurality of cars are in said nearest zone, including means for determining which car's signal device will be operated.

18. In an elevator system for operating a plurality of cars past a floor, a signal device for each car at the floor, a signal means in each car, a control device at the floor common to all the cars, and means responsive to operation of the control device for immediately operating only the signal device corresponding to the nearest approaching car and for operating the signal means on that car as it approaches within a predetermined distance of the floor.

19. In an elevator system for operating a plurality of cars past a plurality of floors, a plurality of signal devices one for the up direction for each car at each floor and one for the down direction for each car at each floor, means functionally related to the stopping of the cars, one for each car, an up call registering means for each floor common to all the cars, a down call registering means for each floor common to all the cars, means responsive to the registration of an up stop call at any floor and to the position of the next approaching car for the up direction for immediately operating the up signal device of that car at that floor and for operating the means functionally related to the stopping of that car upon its approach to within normal stopping distance of that floor and for preventing the said registered call from energizing the signal device of any other car or from energizing the means functionally related to the stopping of any other car, and means responsive to the registration of a down stop call at any floor and to the position of the nearest approaching car for the down direction at that floor for immediately operating the down signal device of that car at that floor and for energizing the means functionally related to the stopping of that car upon its approach to within normal stopping distance of that floor and for preventing the operated call registering means from energizing the signal device of any other car or energizing the means functionally related to the stopping of any other car.

20. In an elevator system for operating a plurality of cars past a plurality of floors, a plurality of signal devices, one for the up direction for each car at each floor and one for the down direction for each car at each floor, an up call registering means for each floor common to all the cars, a down call registering means for each floor common to all the cars, means responsive to the registration of an up stop call at any floor and to the position of the nearest approaching car in the up direction for immediately operating the up signal device of that car at that floor and for operating some means functionally related to the stopping of that car at that floor and for preventing the said registered call from operating the signal device of any other car or affecting the means functionally related to the stopping of any other car, and means responsive to the registration of a down stop call at any floor and to the position of the nearest approaching car in the down direction for immediately operating the down signal device of that car at that floor and for operating some means functionally related to the stopping of that car at that floor and for preventing the said registered call from operating the signal device or from operating any means functionally related to the stopping of any other car.

21. In an elevator system for operating a plurality of cars past a plurality of floors, a plurality of signal devices one for the up direction for each car at each floor and one for the down direction for each car at each floor, an up call registering means for each floor common to all the cars, a down call registering means for each floor common to all the cars, means responsive to the registration of an up stop call at any floor and to the position of the nearest approaching car in the up direction for immediately operating only one up signal device and that for that car at that floor and for operating some means functionally related to the stopping of that car upon its arrival at that floor, and means responsive to the registration of a down stop call at that floor and to the position of the nearest approaching car in the down direction for immediately operating only one down signal device and that for that car at that floor and for operating some means functionally related to the stopping of that car at that floor upon its arrival at that floor.

22. In an elevator system for operating a plurality of cars past a plurality of floors, a plurality of signal devices one for each car at each floor for the up direction and one for each car at each floor for the down direction, an up control device at each floor common to all the cars, a down control device at each floor common to all the cars, a means for each car functionally related to the stopping of that car, means responsive to operation of an up control device at a floor for immediately operating only the signal device at the floor for the nearest approaching car in the up direction for that floor and for operating the means functionally related to the stopping of that car at that floor when it approaches within a predetermined distance thereof, and means responsive to the operation of the down control device for immediately operating only the down signal device at the floor for the nearest approaching car in the down direction for that floor and for operating the means functionally related to the stopping of the car at that floor when it approaches within a predetermined distance thereof in the down direction.

23. In an elevator system for operating a plurality of cars past a plurality of floors, a plurality of signal devices, one for each car at each floor for the up direction and one for each car at each floor for the down direction, means functionally related to the stopping of the cars, one for each car, an up control device at each floor common to all the cars, a down control device at each floor common to all the cars, and means responsive to operation of a control device at a floor for immediately energizing only the signal device at that floor for the nearest approaching car for the direction of the operated control device and for operating the means functionally relates to the stopping of that car at that floor as it approaches within normal stopping distance of the floor.

24. In an elevator system for operating a plurality of cars past a floor, a signal device for each car at the floor, means functionally related to the stopping of the cars, one for each car, a control device at the floor common to all the cars, means responsive to operation of the control device for immediately energizing only the signal device corresponding to the nearest approaching car and for operating the means functionally related to the stopping of that car at that floor, and means responsive to the position of the car at that floor for restoring the first named means to normal condition.

25. In an elevator system for operating a plurality of cars past a floor, a signal device for each car at the floor, means functionally related to the stopping of the cars, one for each car, a control device at the floor common to all the cars, and means responsive to operation of the control device for immediately energizing only the signal device corresponding to the nearest approaching car and for operating the means functionally related to the stopping of that car at the floor.

26. In an elevator system for operating a plurality of cars past a plurality of floors, a plurality of signal devices one for each car at each floor for the up direction and one for each car at each floor for the down direction, an up control device at each floor common to all the cars, a down control device at each floor common to all the cars, an up call registering device associated with each up control device and responsive to operation thereof for registering a stop call in the up direction, a down call registering device associated with each down control device and responsive to operation thereof for registering a stop call in the down direction, means responsive to operation of a stop call registering device for immediately energizing only the signal device at the floor of the operated stop call registering device for the nearest approaching car for the direction of the operated call registering device, and means responsive to the presence of the car corresponding to the direction of the registered call at the floor for which the call is registered for cancelling the registered call.

27. In an elevator system for operating a plurality of cars past a plurality of floors, a plurality of signal devices, one for each car at each floor for the up direction, and one for each car at each floor for the down direction, an up control device at each floor common to all the cars, a down control device at each floor common to all the cars, an up call registering device associated with each up control device and responsive to operation thereof for registering a stop call in the up direction, a down call registering device associated with each down control device and responsive to operation thereof for registering a stop call in the down direction, and means responsive to operation of a stop call registering device for immediately energizing only the signal device at the floor of the operated stop call registering device for the nearest approaching car for the direction of the operated call registering device.

28. In an elevator system for operating a plurality of cars past a plurality of floors, a plurality of signal devices, one for each car at each floor for the up direction, and one for each car at each floor for the down direction, an up control device at each floor common to all the cars, a down control device at each floor common to all the cars, and means responsive to operation of a control device at a floor for immediately energizing only the signal device at that floor for the nearest approaching car for the direction of the operated control device.

29. In an elevator system for operating a plurality of cars past a floor, a signal device for each car at the floor, a control device at the floor common to all the cars, and means responsive to operation of the control device for immediately energizing only the signal device corresponding to the nearest approaching car.

30. In a signal system for a plurality of elevators operable past a floor; a floor lantern at said floor for each car; a call switch at the floor common to the cars; a car selecting means common to the cars; said selecting means being operable to a plurality of positions; each position corresponding to one of said floor lanterns; means responsive to operation of said call switch for causing operation of said selecting means; and means responsive to operation of said selecting means to a predetermined one of said positions for stopping said operation of the selecting means and for operating the corresponding floor lantern.

31. A signalling system for a bank of elevator cars operable past a plurality of floors comprising, in combination, signalling means individual to each floor and to each car, call means individual to each floor, selecting means disposed to be responsive to the operation of the call means at a floor for selecting the car nearest said floor, means for energizing the signalling means at said floor individual to the selected car, and means for continuously maintaining said signalling means energized when a car other than the selected car becomes the car nearest said floor.

32. A signalling system for a bank of elevator cars operable past a plurality of floors comprising, in combination, signalling means individual to each floor and to each car, call means individual to each floor, a car selecting mechanism individual to each floor and provided with a plurality of contact members, each contact member being individual to a car, means operable in response to the operation of the call means at a floor to move said selecting mechanism past each of said contact members to select the car nearest said floor, means for energizing the signalling means at said floor individual to the selected car, and means for continuously maintaining said signalling means energized when a car other than the selected car becomes the car nearest said floor.

FRED C. ECKMANN.
*Administrator of the Estate of Emil P. Butusov, Deceased.*